(12) United States Patent
Yang et al.

(10) Patent No.: US 10,608,399 B1
(45) Date of Patent: Mar. 31, 2020

(54) MANUFACTURING TECHNIQUE OF ULTRA-WIDEBAND HIGH GAIN OPTICAL FIBERS AND DEVICES

(71) Applicant: South China University of Technology, Guangzhou (CN)

(72) Inventors: Zhongmin Yang, Guangzhou (CN); Guowu Tang, Guangzhou (CN); Zhishen Zhang, Guangzhou (CN)

(73) Assignee: South China University of Technology, Guangzhou (CN)

( * ) Notice: Subject to any disclaimer, the term of this patent is extended or adjusted under 35 U.S.C. 154(b) by 0 days.

(21) Appl. No.: 16/266,942

(22) Filed: Feb. 4, 2019

(30) Foreign Application Priority Data

Dec. 13, 2018 (CN) .......................... 2018 1 1523780

(51) Int. Cl.
*H01S 3/094* (2006.01)
*H01S 3/067* (2006.01)

(52) U.S. Cl.
CPC ...... *H01S 3/094003* (2013.01); *H01S 3/0675* (2013.01); *H01S 3/094042* (2013.01); *H01S 3/094065* (2013.01)

(58) Field of Classification Search
CPC ............. H01S 3/094003; H01S 3/0675; H01S 3/094065; H01S 3/094042
See application file for complete search history.

(56) References Cited

U.S. PATENT DOCUMENTS

| 2003/0152115 A1* | 8/2003 | Jiang | ................... | H01S 3/06716 372/6 |
| 2011/0069723 A1* | 3/2011 | Dong | .................. | H01S 3/06716 372/6 |

(Continued)

FOREIGN PATENT DOCUMENTS

| CN | 101702959 A | 5/2010 |
| CN | 103094821 A | 10/2012 |

(Continued)

OTHER PUBLICATIONS

Chinese Search Report for Application No. 201811523780.2 completed Apr. 24, 2019.

(Continued)

*Primary Examiner* — Xinning (Tom) Niu
(74) *Attorney, Agent, or Firm* — Miller, Matthias & Hull LLP

(57) ABSTRACT

A manufacturing technique of ultra-wideband high gain optical fibers and devices is disclosed, including: (1) manufacturing a gain fiber, which is a composite structural optical fiber, having a core composed of a plurality of sets of sector structures distributed symmetrically or a plurality of concentric ring structures. The core is composed of at least two kinds of rare-earth-ion-doped glass, and luminescence centers are located in different sector or ring structure regions; and (2) constructing a fiber laser: using the gain fiber, selectively exciting rare earth ions in different regions in the core by controlling a shape of pump light spot, and combining with fiber grating pairs to realize a tunable laser (Continued)

output. The present disclosure can manufacture gain fibers with high-gain and ultra-wideband characteristics by combining the design of the fiber structure and the control of the light field of the pump light.

16 Claims, 3 Drawing Sheets

(56) References Cited

U.S. PATENT DOCUMENTS

| | | | | |
|---|---|---|---|---|
| 2012/0302423 | A1* | 11/2012 | Kinoshita | C03C 3/068 501/37 |
| 2014/0140361 | A1* | 5/2014 | Jiang | H01S 3/06716 372/6 |
| 2016/0344155 | A1* | 11/2016 | Mueller | H01S 3/1026 |

FOREIGN PATENT DOCUMENTS

| | | |
|---|---|---|
| CN | 202486354 U | 10/2012 |
| CN | 105236730 A | 1/2016 |
| CN | 105356206 A | 2/2016 |
| CN | 107302174 A | 10/2017 |
| CN | 108493752 A | 9/2018 |
| WO | WO2014197052 A2 | 12/2014 |

OTHER PUBLICATIONS

Office Action for Chinese Application No. 201811523780.2 dated Apr. 24, 2019.
Hu et al.: "Global Optimization Research on High Power Continue Wave Fiber Lasers", Beijing Jiaotong University, Beijing, Jan. 2015.
Second Office Action for Priority Chinese Application No. 201811523780.2 dated Aug. 15, 2019.
Chinese Search Report for Application No. 201811523780.2 completed Aug. 5, 2019.

* cited by examiner

MANUFACTURING TECHNIQUE OF ULTRA-WIDEBAND HIGH GAIN OPTICAL FIBERS AND DEVICES

CROSS REFERENCE TO RELATED APPLICATION

This application claims the benefit of Chinese patent application No. 201811523780.2, filed Dec. 13, 2018, entitled "MANUFACTURING TECHNIQUE OF ULTRA-WIDEBAND HIGH GAIN OPTICAL FIBERS AND DEVICES", the content of which is incorporated herein by reference in its entirety.

TECHNICAL FIELD

The present disclosure relates to the field of optical fiber and fiber laser technology, and more particularly; to a manufacturing technique of ultra-wideband high gain optical fibers and devices.

BACKGROUND

A fiber laser is usually composed of a pump source, a gain fiber, and a resonant cavity. The gain fiber is the key component of the fiber laser, which is generally the rare-earth-ion-doped glass fiber. The pump source provides energy for spontaneous emission, stimulated emission, and amplification from the rare earth ions in the gain fiber. The resonant cavity realizes round-trip oscillation of the signal light and finally obtains the laser output. The fiber lasers are composed of gain fiber and optical fiber devices, such as fiber grating, fiber coupler, fiber polarization controller, and so on, which are fusion spliced or connected to each other. Compared with gas lasers and traditional solid-state lasers, the fiber lasers have advantages of compact structure, high beam quality, good heat dissipation, high stability, and tunable operating wavelength, which have been widely used in military and civilian fields such as optical fiber communication, biomedical, material processing, atmospheric monitoring, laser radar, and so on. With the development of technology and the needs of society, many applications today require light sources to realize high-power, stable, low-noise, high-efficiency, and tunable laser output over a wide wavelength range. Therefore, ultra-wideband tunable, high-power, and ultra-compact fiber lasers have become a research hotspot in recent years. In addition, the operating wavelength of the fiber laser continues to extend in a mid-infrared region. For example, the 2.0 μm laser is located in a human eye safety waveband and is in a low-loss window of atmospheric transmission, and covers spectral absorption peaks of molecules such as $H_2O$, CO, $CO_2$, etc., which has important application value in many fields such as laser radar, laser detection, laser medical treatment, environmental monitoring, and so on. Therefore, the output of the near-mid-infrared tunable laser has aroused the research upsurge of domestic and foreign scholars.

Currently, a tuning range of mainstream tunable lasers is typically limited to a single waveband. More recently, researchers have proposed an ultra-wideband, continuously tunable, mid-infrared fiber laser that includes three different rare-earth-ion-doped optical fibers, three corresponding laser pump sources, and a planar diffraction grating. By connecting three kinds of optical fibers doped with different rare earth ions in parallel, and using a same planar diffraction grating as a wavelength tuning device, a continuously tunable laser output in a wavelength range from 2.8 μm to 4 μm was realized. Although the above solution can realize the tunable mid-infrared fiber laser output, it adopts a parallel branch method, which requires a plurality of pump sources of different wavelengths, multiple gain fibers doped with different rare earth ions, and a large number of passive components, leading to large loss, complicated preparation process, and uncompact structure, which is not conducive to realizing the low threshold, high energy transformation efficiency, and ultra-compact tunable fiber laser.

In addition to building a new cavity structure fiber laser, gain fibers with new components and new structures have also become research hotspots. Due to a limited emission wavelength of a single rare earth ion luminescent center doped optical fibers, the researchers introduce different rare earth luminescent ions to a glass optical fiber by co-doping, which can be used to realize the wideband tunable laser output by utilizing the emission wavelengths of different rare earth ions. Compared with the glass optical fiber doped with a single rare earth ion, the way by co-doping a plurality of rare earth luminescence centers can increase a width of an emission spectrum to a certain extent, but the increment is limited. At the same time, there are large non-radiative transitions between different luminescent rare earth ions, and a large amount of thermal load is caused, thereby reducing luminous efficiency and laser performance. More innovatively, there is proposed a multi-doped rare earth ions multi-core double-cladding optical fiber in which a plurality of cores of independent rare earth ions are disposed in a core. Different emission wavelengths are generated by using different rare earth ions in a single gain fiber, which can realize signal output in a wide wavelength range. However, a utilization rate of the core during pumping is low, and other wavebands of fluorescence emission are generated, thereby generating extra heat, reducing laser performance, and failing to achieve high efficient wideband tunable laser output.

In addition, from the perspective of the pumping mechanism, the entire core of the gain fiber is generally pumped simultaneously. Even in the above-described multi-core optical fiber, the pump light was coupled into the entire optical fiber. This method of full-core pumping inevitably simultaneously excites all rare earth ions in the core. Therefore, except for the laser at the resonant wavelength, the fluorescence of the remaining wavebands will eventually be converted into a large amount of heat, inevitably introducing the noises and reducing the stability of the fiber laser. On the other hand, different rare earth ions need to use the pump sources with different wavelengths. For example, $Tm^{3+}$ ions generally use a semiconductor laser of 808 nm as the pump source, while $Er^{3+}$ ions generally use a semiconductor laser of 980 nm as the pump source. The lasers with multiple wavelengths are required as the pump sources in multi-doped rare earth ions, resulting in an uncompact structure and complex operation of the laser.

It can be seen that the tunable laser output with compact structure, high efficiency, high power and low noise cannot be realized at present, and in particular, wideband and ultra-wideband near-mid-infrared tunable laser output cannot be realized. How to selectively and efficiently utilize a variety of rare earth luminescent ions in a single optical fiber to achieve a dual effects of the high luminous efficiency and the wide emission spectrum, and to avoid the generation of excess heat during pumping, and how to solve the problem of the complex operation and the uncompact structure due to the pump sources with multiple wavelengths required in a single optical fiber doped with different rare earth ions, are urgent problems to realize high performance wideband tunable laser output.

SUMMARY

The present disclosure focus on the problem to be solved for realizing the high-performance wideband tunable laser output in the prior art, and expands the applications in the field of wideband tunable single-frequency fiber lasers and high-repetition-rate mode-locked fiber lasers, to provide a manufacturing technique of ultra-wideband high gain optical fibers and devices. A design of an optical fiber structure and control of a pump light field are combined innovatively, and according to the light field distribution of the pump light, a matching gain fiber with a composite core structure, meanwhile with high gain and ultra-wideband characteristics is designed and manufactured. In a single gain fiber, various rare earth luminescent ions can be independently and efficiently utilized, so that the luminescence efficiency is higher and the spectrum is wider. The luminescent ions in different regions of the core are selectively excited, and the fluorescence emission of other wavebands is suppressed, which avoids generation of extra heat during the traditional pumping process of the entire core, thereby making the output laser have the advantages of high power, high efficiency, low noise, wideband tunability, and high stability. More preferably, in the present disclosure, by preferably selecting species of the rare earth ions, and by co-doping sensitized rare earth ions in different core regions of sector shape or ring shape, the sensitized rare earth ions can effectively transfer the energy to different rare earth luminescent ions after absorbing the pump light with a single pumping wavelength, thus the problem that the pumping mechanism is complicated and the structure is uncompact in the prior art is solved.

The object of the present disclosure is achieved by the following technical solutions.

A manufacturing technique of ultra-wideband high gain optical fibers and devices includes following steps:

(1) manufacturing a gain fiber, wherein the gain fiber is a composite structural optical fiber comprising a core and a cladding. The core is composed of a plurality of sets of symmetrically distributed sector structures or a plurality of concentric ring structures, which are composed of at least two kinds of rare-earth-ion-doped glass, luminescence centers of rare earth ions are located in different sector structure regions or ring structure regions in the core respectively. The gain fiber has a gain coefficient, for example, a gain per unit length larger than 1 dB/cm, and a gain bandwidth greater than 150 nm.

(2) constructing a fiber laser, including: using the composite structural optical fiber in step (1) as the gain fiber, selectively exciting the rare earth ions in different sector structure regions or ring structure regions in the core by controlling a shape of a pump light spot, and combining with fiber grating pairs to achieve a tunable laser output.

In an embodiment, a method of manufacturing the gain fiber in step (1) is a rod-in-tube method, a molten core drawing method, a high pressure assisted melt filling method, a high pressure chemical vapor deposition method, a double crucible method, a casting method, an extrusion molding method or a 3D printing method.

In an embodiment, the shape of the pump light spot is controlled by a mode selective coupler and/or a fiber polarization controller in step (2).

In an embodiment, for the gain fiber of which the core is composed of the sector structures, firstly pump light is converted into a linear polarization mode $LP_{11}$ by using the mode selective coupler. The intensity distribution of $LP_{11}$ mode is two-lobed, i.e., the light field has two maximum values in the azimuthal direction. By using the polarization controller, the distributed pumping $LP_{11}$ mode can be rotated to different sector structure regions, which are doped with different rare earth ions. And the laser switching between different wavebands is achieved. Central operating wavelengths of the fiber grating pair at both ends of the gain fiber can be adjusted by a temperature or stress regulating device so that a wavelength of output laser is tunable in a specific waveband.

In an embodiment, for the gain fiber of which the core is composed of the ring structures, the pump light is converted into a vector mode in a ring fiber by the mode selective coupler, to generate ring pump light. In an optical fiber with a ring-core structure, vector modes in different orders ($HE_{11}$, $HE_{21}$, $HE_{n1}$, etc.) are all annularly-distributed beams. Temperature or stress regulating is performed on the mode selective coupler to convert the pump light into the vector modes in different orders ($HE_{11}$ and $HE_{91}$), so that the maximum values of the light field are located in the different ring structure regions doped with different rare earth ions, thereby exciting different rare earth ions to generate corresponding gains, and realizing laser switching between different wavebands. Central operating wavelengths of the fiber grating pairs at both ends of the gain fiber can be adjusted by a temperature or stress regulating device so that the wavelength of output laser is tunable in a specific waveband.

In an embodiment, the rare-earth-ion-doped glass is multi-component glass.

In an embodiment, the cladding is composed of multi-component glass.

In an embodiment, the multi-component glass is selected from one or more of multi-component germanate glass, multi-component phosphate glass, multi-component tellurite glass, multi-component chalcogenide glass, multi-component fluoride glass, multi-component aluminate glass, multi-component borate glass, multi-component silicate glass, multiple-component bismuthate glass or multi-component germanosilicate glass. Conventional silica glass has an intrinsic phase-separating section, in which the rare earth ions have a low solubility, so that the gain of the rare-earth-ion-doped silica fiber is low. However, the multi-component glass has higher rare earth ion solubility, and their physicochemical properties can be adjusted according to the component, which is suitable for manufacturing high gain optical fibers.

In an embodiment, the multi-component glass is one or more of multi-component germanate glass, multi-component silicate glass or multi-component tellurite glass. The germanate glass has high rare earth ion solubility, low phonon energy of 900 $cm^{-1}$, high infrared transmittance, excellent physicochemical and mechanical properties, and high laser damage threshold, making it becomes a host material of near-infrared and mid-infrared lasers with the most prominent comprehensive advantages. When the optical fiber is used in the near-infrared and mid-infrared wavebands, each of the cladding and the core is preferably made of multi-component germanate glass.

In an embodiment, the cladding has a single cladding structure or a multi-cladding structure.

In an embodiment, an outer surface of the cladding further includes a coating layer.

In an embodiment, the composite structural optical fiber is a single mode optical fiber. The single mode optical fiber can be used to achieve wideband tunable single-frequency fiber laser output with narrow line width and low noise or wideband tunable ultra-high-repetition-rate mode-locked fiber laser output.

In an embodiment, the rare earth ions are selected from one or more of $Er^{3+}$, $Tm^{3+}$, $Ho^{3+}$, $Ce^{3+}$, $Eu^{3+}$, $Eu^{2+}$, $Sm^{3+}$, $Sm^{2+}$, $Tb^{3+}$, $Nd^{3+}$, $Dy^{3+}$, $Yb^{3+}$ or $Pr^{3+}$. The near-infrared and mid-infrared regions cover a range within an atmospheric transmission window and eye-safe wavelengths, and water has strong absorption in this waveband, which are widely used in the fields of medical treatment, remote sensing, nonlinear spectroscopy, military, and so on. By doping the above-described rare earth ions in the optical fiber, luminescence emission in the near-infrared and mid-infrared wavebands can be realized.

In an embodiment, the gain fiber is a single mode optical fiber, and the sectorial multi-core structure is made up of two or three sets of symmetrically distributed sector structures. Preferably, both the core and the cladding glass are made of multi-component germanate glass, and the rare earth ions in the core are selected from two or three of $Er^{3+}/Yb^{3+}$, $Tm^{3+}/Yb^{3+}$, or $Ho^{3+}/Yb^{3+}$.

In an embodiment, the gain fiber is a single mode optical fiber, and the ring multi-core structure is made up of two or three concentric ring cores. Preferably, both the core and the cladding glass are made of multi-component germanate glass, and the rare earth ions in the core are selected from two or three of $Er^{3+}/Yb^{3+}$, $Tm^{3+}/Yb^{3+}$, or $Ho^{3+}/Yb^{3+}$.

For the selection of the rare earth ions, the stimulated emission of transition $^4I_{13/2} \rightarrow {}^4I_{15/2}$ of the rare earth ion $Er^{3+}$ can generate 1.5 μm laser, and the stimulated emission of transition $^3F_4 \rightarrow {}^3H_6$ of $Tm^{3+}$ and transition $^5I_7 \rightarrow {}^5I_8$ of $Ho^{3+}$ can generate 2.0 μm laser, thus the ultra-wideband near-infrared and mid-infrared tunable laser output can be realized by using $Er^{3+}$, $Tm^{3+}$, or $Ho^{3+}$. Conventionally, $Er^{3+}/Tm^{3+}$ co-doped or $Er^{3+}/Tm^{3+}/Ho^{3+}$ triple-doped is used to realize the near-infrared and mid-infrared tunable laser output. However, during the co-doping or triple-doping, there is a large non-radiative transition between different luminescent rare earth ions which reduces the luminous efficiency, and these non-radiative transitions also cause a large amount of thermal load, thereby reducing the laser performance. In addition, in the solution of the single-doping rare earth ions, since the optimum pump wavelengths of $Tm^{3+}$, $Er^{3+}$, and $Ho^{3+}$ are different, pump sources with multiple wavelengths are required, so that the structure of the fiber laser is uncompact and the operation is complicated. In the present disclosure, the above-described problem can be solved by respectively doping $Yb^{3+}$ as a sensitizer. In the co-doping, the luminescent rare earth ions are mainly $Tm^{3+}$, $Er^{3+}$ and $Ho^{3+}$, and $Yb^{3+}$ is usually used as the sensitized rare earth ion for absorbing pump light, which is the commercial semiconductor laser of 980 nm. After $Yb^{3+}$ absorbs the pump light, the absorbed pump light energy can be efficiently transferred to $Er^{3+}$, $Tm^{3+}$, and $Ho^{3+}$ via the energy transfer between the energy levels of $Yb^{3+}$ and $Tm^{3+}$, $Er^{3+}$, and $Ho^{3+}$, thereby high-efficiency wideband emission in the wavebands of 1.5-2.0 μm can be realized by using the pump source with a single wavelength.

In an embodiment, each of the rare earth ions $Er^{3+}$, $Tm^{3+}$, $Ho^{3+}$, and $Yb^{3+}$ in the core has a doping concentration larger than 5 wt %. The manufactured gain fiber has a maximum gain coefficient larger than or equal to 5.2 dB/cm in the near-infrared band. The manufactured gain fiber has a maximum gain coefficient larger than or equal to 3.2 dB/cm in the mid-infrared band. By preferably using the multi-component glass, high concentration of the rare earth ions can be doped in the optical fiber, so that the high gain is obtained. The high gain optical fiber has larger pump absorption and a high gain per unit length, thus the high efficiency laser output can be realized in a very short piece of gain fiber. Therefore, the high gain per unit length of active fiber is the key material for developing high-power, high-efficiency, and ultra-compact fiber lasers, making it easier to realize single-frequency laser output and high-repetition-rate mode-locked laser output.

Compared with the prior art, the present disclosure has the following beneficial effects.

(1) The manufactured gain fiber has the characteristics of high gain and ultra-wideband, can independently and efficiently utilize the rare earth luminescent ions of different emission wavelengths in a single gain fiber, and has a high luminous efficiency and a wide emission spectrum. In particular, according to the distribution of the light field of the pump light, the multi-waveband wideband tunable gain fiber is designed specifically. The core of the gain fiber is designed as a plurality of sets of symmetrical sector structures or a plurality of concentric ring structures. Therefore, the luminescent ions in different regions of the core can be directionally excited while suppressing the fluorescence emission in other wavebands, avoiding the generation of extra heat during the traditional pumping process of the entire core, thereby more stable and efficient tunable laser output can be realized.

(2) A variety of preferred technical solutions are provided, including the selection of the cladding glass, the core glass, and the rare earth ions. In particular, the core is divided into two or three sets of regions, and the rare earth ions in the core are selected from two or three kinds of $Er^{3+}/Yb^{3+}$, $Tm^{3+}/Yb^{3+}$, or $Ho^{3+}/Yb^{3+}$. Preferably the core glass is multi-component glass with high rare earth ion solubility, and the doping concentration of the rare earth ions can be larger than 5 wt %, so that the maximum gain coefficient of the gain fiber in the near infrared waveband is larger than or equal to 5.2 dB/cm, and the maximum gain coefficient of the gain fiber in the mid-infrared waveband is greater than or equal to 3.2 dB/cm. In addition, each region of the core is co-doped with $Yb^{3+}$ as the sensitizer, which can realize high-efficiency 1.5-2.0 μm wideband tunable laser output by using a single-wavelength commercial pump source, making the laser more compact and the operation simpler.

(3) The present disclosure can solve the bottleneck problem that needs to be solved in the prior art to realize an ultra-wideband and high-performance tunable laser output. Ultra-wideband and high gain optical fibers are designed and manufactured, and ultra-wideband tunable fiber lasers are built, which can expand the applications in the fields of the single-frequency fiber lasers and the ultra-high-repetition-rate mode-locked fiber lasers with tunable wideband.

DETAILED DESCRIPTION OF THE EMBODIMENTS

A manufacturing technique of ultra-wideband high gain optical fibers and devices in the present disclosure will be further described in detail below in conjunction with specific embodiments.

Embodiment 1

In this embodiment, a manufacturing technique of ultra-wideband high gain optical fibers and devices includes following steps.

(1) Manufacturing a Gain Fiber

Figure 1:
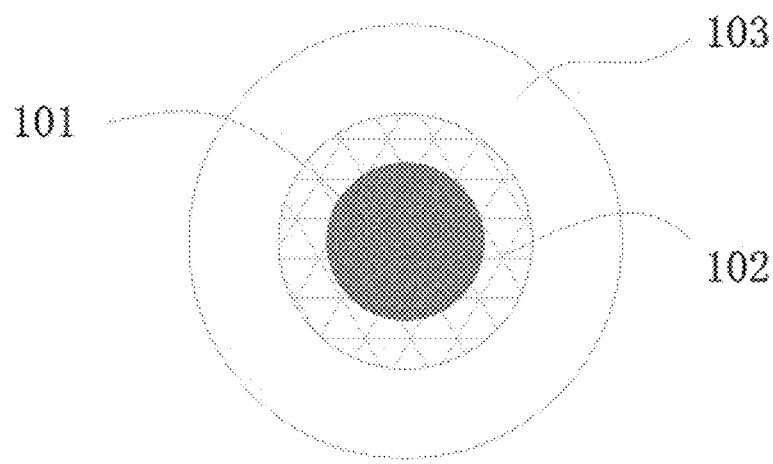
FIG. 1 illustrates a schematic diagram of cross-section of a gain fiber described in Embodiment 1.

A cross-section of the gain fiber is shown in FIG. 1. The gain fiber is a composite structural optical fiber including a core and a cladding 103 coating on a surface of the core. The core is composed of a rare-earth-ion-doped region 101 and a rare-earth-ion-doped region 102, which are arranged concentrically. The rare-earth-ion-doped region 101 is $Er^{3+}/Yb^{3+}$ co-doped multi-component silicate glass, the rare-earth-ion-doped region 102 is $Tm^{3+}/Yb^{3+}$ co-doped multi-component germanate glass, and the cladding 103 is multi-component germanate glass without rare earth ions. Each of $Er^{3+}$, $Tm^{3+}$, and $Yb^{3+}$ has a doping concentration larger than 5 wt %.

The gain fiber is manufactured by a molten core drawing method including the following steps.

a. Glass melting: a conventional melting-annealing method is used to prepare bulk core glass, respectively, doped with $Er^{3+}/Yb^{3+}$ and $Tm^{3+}/Yb^{3+}$, and bulk cladding glass.

b. Cladding glass processing: the prepared cladding glass is mechanically processed into a glass tube of a design size, and then the inner and outer surfaces are polished by physical and chemical methods to obtain the cladding 103.

c. Manufacture of composite structural core rod: the composite structural core is manufactured by the molten core drawing method. The bulk $Er^{3+}/Yb^{3+}$ co-doped core glass is mechanically processed into a glass cylinder of a preset size, and the bulk $Tm^{3+}/Yb^{3+}$ co-doped core glass is mechanically processed into a glass tube of a preset size. Then the surfaces are polished by physical and/or chemical methods, and the processed core glass cylinder and the processed core glass tube are assembled into a composite structural core preform, that is, the rare-earth-ion-doped region 101 and the rare-earth-ion-doped region 102 are sequentially formed. A composite structural core rod of the preset size is obtained by drawing in a drawing tower. The sizes of the cladding and each core in steps b and c are determined according to the design requirements of a single mode optical fiber.

d. Optical fiber drawing: the composite structural core rod and the cladding glass tube are assembled into a composite structural fiber preform, which is drawn into the gain fibers by a molten core drawing method, and the cross-section of the gain fiber is shown in FIG. 1.

As measured by a small signal gain test method, the composite structural optical fiber has a maximum gain coefficient of 5.7 dB/cm in the near-infrared waveband, and a maximum gain coefficient of 3.2 dB/cm in the mid-infrared waveband.

(2) Constructing a Fiber Laser

Figure 2:
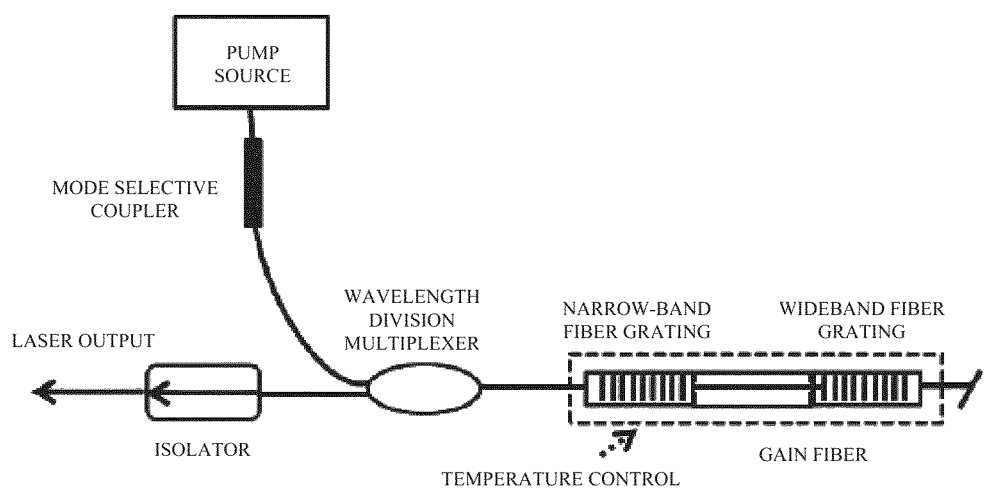
FIG. 2 illustrates a schematic diagram of a structure and laser output of a fiber laser described in Embodiment 1.

A tunable laser output is realized by constructing a fiber laser using the above-described gain fiber. The structure of the fiber laser and the laser output are shown in FIG. 2. The 980 nm pump light is converted into a vector mode by a mode selective coupler, to generate ring pump light. Temperature or stress control is performed on the mode selective coupler to convert the pump light into vector modes of different orders ($HE_{11}$ and $HE_{91}$), so that a maximum value of light field is located in the rare-earth-ion-doped region 101 or the rare-earth-ion-doped region 102, thereby exciting different rare earth ions to generate corresponding gains, and realizing laser switching between different wavebands. Central operating wavelengths of fiber grating pairs at both ends of the composite structural gain fiber can be adjusted by a temperature or stress regulating device, and the lasing wavelength is tunable in a specific waveband from 1,450 nm to 2,050 nm.

Embodiment 2

In this embodiment, a manufacturing technique of ultra-wideband high gain optical fibers and devices includes the following steps.

(1) Manufacturing a Gain Fiber

Figure 3:
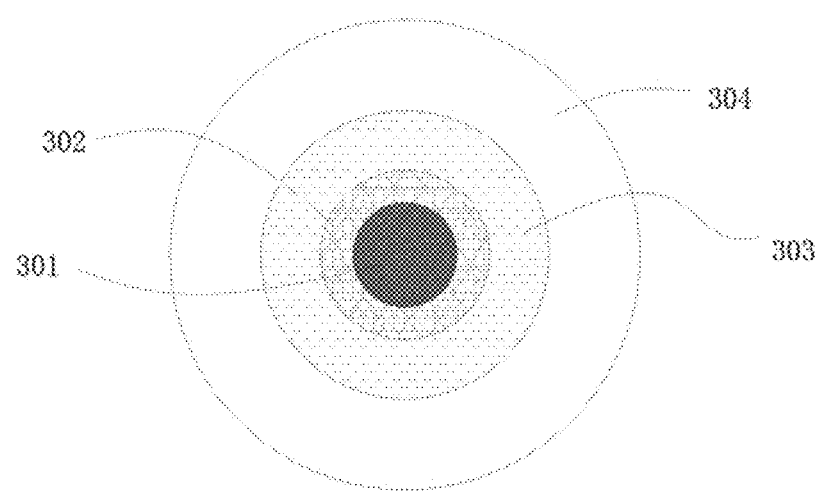
FIG. 3 illustrates a schematic diagram of cross-section of a gain fiber described in Embodiment 2.

A cross-section view of the gain fiber is shown in FIG. 3. The gain fiber includes a core and a cladding 304 coating on the surface of the core. The core is composed of a rare-earth-ion-doped region 301, a rare-earth-ion-doped region 302, and a rare-earth-ion-doped region 303, which are arranged concentrically. The rare-earth-ion-doped region 301 is $Er^{3+}/Yb^{3+}$ co-doped multi-component germanate glass, the rare-earth-ion-doped region 302 is $Tm^{3+}/Yb^{3+}$ co-doped multi-component germanate glass, the rare-earth-ion-doped region 303 is $Ho^{3+}/Yb^{3+}$ co-doped multi-component germanate glass, and the cladding 304 is multi-component germanate glass without rare earth ions. Each of $Er^{3+}$, $Tm^{3+}$, $Ho^{3+}$ and $Yb^{3+}$ has a doping concentration larger than 5 wt %.

The gain optical fiber is manufactured by a rod-in-tube method including the following steps.

a. Glass melting: a conventional melting-annealing method is used to prepare bulk core glass, respectively, doped with $Er^{3+}/Yb^{3+}$, $Tm^{3+}/Yb^{3+}$, and $Ho^{3+}/Yb^{3+}$, and bulk cladding glass.

b. Cladding glass processing: the melted cladding glass is mechanically processed into a glass tube of a design size, and then the inner and outer surfaces are polished by physical and chemical methods to obtain the cladding 304.

c. Manufacture of composite structural core rod: the composite structural core is manufactured by the rod-in-tube method, the bulk $Er^{3+}/Yb^{3+}$ co-doped core glass is mechanically processed into a glass cylinder of a preset size, and the bulk $Tm^{3+}/Yb^{3+}$ and $Ho^{3+}/Yb^{3+}$ co-doped core glasses are mechanically processed into glass tubes of preset sizes, respectively. Then the surfaces are polished by physical and/or chemical methods and the processed core glass cylinder and the processed core glass tubes are assembled into a composite structural core preform, that is, the rare-earth-ion-doped region 301, the rare-earth-ion-doped region 302, and the rare-earth-ion-doped region 303 are sequentially formed. A composite structural core rod of the preset size is obtained by drawing the preform in a drawing tower. The sizes of the cladding and each core in steps b and c are determined according to the design requirements of a single mode optical fiber.

d. Optical fiber drawing: the composite structural core rod and the cladding glass tubes are assembled into a composite structural fiber preform, which is drawn into the gain fibers, and their cross-section is shown in FIG. 3.

As measured by a small signal gain test method, the composite structural optical fiber has a maximum gain coefficient of 6.5 dB/cm in the near-infrared waveband, and a maximum gain coefficient of 5.5 dB/cm in the mid-infrared waveband.

(2) Constructing a Fiber Laser

A tunable laser output is realized by constructing a fiber laser using the above-described gain fiber. The 980 nm pump light is converted into a vector mode by a mode selective coupler, to generate ring pump light. Temperature or stress control is performed on the mode selective coupler to convert the pump light into vector modes in different orders ($HE_{11}$ and $HE_{91}$), so that the maximum value of light field is located in the rare-earth-ion-doped region 301, the rare-earth-ion-doped region 302 or the rare-earth-ion-doped region 303, thereby exciting different rare earth ions to generate corresponding gains, and realizing laser switching between different wavebands. Central operating wavelengths of fiber grating pairs at both ends of the composite structural gain fiber can be adjusted by a temperature or stress regulating device, and the lasing wavelength is tunable in a specific waveband from 1,450 nm to 2,150 nm.

Embodiment 3

In this embodiment, a manufacturing technique of ultra-wideband high gain optical fibers and devices includes following steps.

(1) Manufacturing a Gain Fiber

Figure 4:
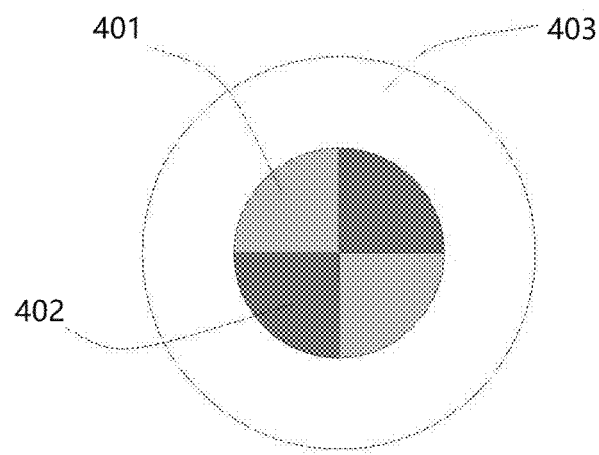
FIG. 4 illustrates a schematic diagram of cross-section of a gain fiber described in Embodiment 3.

A cross-sectional view of the gain fiber is shown in FIG. 4. The gain fiber includes a core and a cladding 403 coating on the surface of the core. The core is composed of a rare-earth-ion-doped region 401 including a pair of sector structures arranged symmetrically and a rare-earth-ion-doped region 402 including a pair of sector structures arranged symmetrically. The rare-earth-ion-doped region 401 is $Er^{3+}/Yb^{3+}$ co-doped multi-component tellurite glass, the rare-earth-ion-doped region 402 is $Tm^{3+}/Yb^{3+}$ co-doped multi-component tellurite glass, and the cladding 403 is multi-component tellurite glass without rare earth ions. Each of $Er^{3+}$, $Tm^{3+}$ and $Yb^{3+}$ has a doping concentration larger than 5 wt.

The gain fiber is manufactured by the rod-in-tube method including the following steps.

a. Glass melting: a conventional melting-annealing method is used to prepare bulk core glass, respectively, doped with $Er^{3+}/Yb^{3+}$ and $Tm^{3+}/Yb^{3+}$, and bulk cladding glass.

b. Cladding glass processing: the melted cladding glass is mechanically processed into a glass tube of a design size, and then the inner and outer surfaces are polished by physical and chemical methods to obtain the cladding 403.

c. Manufacture of composite structural core rod: the composite structural core is manufactured by a one-step drawing method and mechanical or laser cutting, the bulk $Er^{3+}/Yb^{3+}$ and $Tm^{3+}/Yb^{3+}$ co-doped core glasses are mechanically processed into glass cylinders of a preset size, respectively. And then the glass cylinders are drawn in a drawing tower to obtain core rods of a preset size after polishing the surfaces of the glass cylinders. The obtained core rods of a small size are respectively mechanically cut or cut by laser into four equal sectors which are then assembled into a composite structural core rod according to a design to form the rare-earth-ion-doped region 401 and the rare-earth-ion-doped region 402.

d. Optical fiber drawing: the composite structural core rod and the cladding glass tubes are assembled into a composite structural fiber preform, which is drawn into the gain fibers. The cross-section of the gain fiber is shown in FIG. 4.

As measured by a small signal gain test method, the composite structural optical fiber has a maximum gain coefficient of 6.2 dB/cm in the near-infrared waveband, and a maximum gain coefficient of 4.5 dB/cm in the mid-infrared waveband.

(2) Constructing a Fiber Laser:

A tunable laser output is realized by constructing a fiber laser using the above-described gain fiber. The 980 nm pump light is converted into a linear polarization mode $LP_{11}$ with a two-lobed light spot shape, i.e., a light field has two maximum values in the azimuthal direction, by a mode selective coupler. The $LP_{11}$ mode can be rotated by using a polarization controller, so that the maximum values of the light field are located in the rare-earth-ion-doped regions 401 or the rare-earth-ion-doped regions 402, thereby exciting different rare earth ions to generate corresponding gains, and realizing laser switching between different wavebands. Central operating wavelengths of the fiber grating pairs at both ends of the composite structural gain fiber can be adjusted by a temperature or stress regulating device, and the lasing wavelength is tunable in a specific waveband from 1,450 nm to 2,050 nm.

Embodiment 4

In this embodiment, a manufacturing technique of ultra-wideband high gain optical fibers and devices includes following steps.

(1) Manufacturing a Gain Fiber

Figure 5:
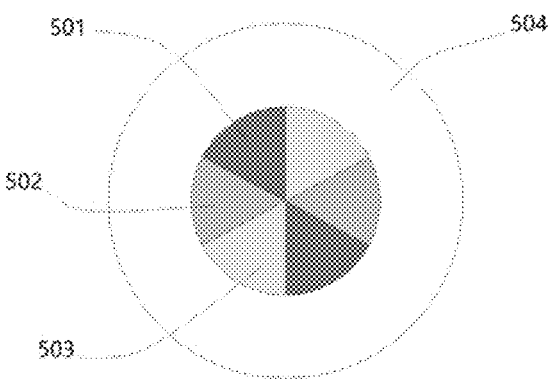
FIG. 5 illustrates a schematic diagram of cross-section of a gain fiber described in Embodiment 4.

A cross-sectional view of the gain fiber is shown in FIG. 5. The gain fiber includes a core and a cladding 504 coating on the surface of the core. The core is composed of a rare-earth-ion-doped region 501 including a pair of sector structures arranged symmetrically, a rare-earth-ion-doped region 502 including a pair of sector structures arranged symmetrically, and a rare-earth-ion-doped region 503 including a pair of sector structures arranged symmetrically. The rare-earth-ion-doped region 501 is $Er^{3+}/Yb^{3+}$ co-doped multi-component germanosilicate glass, the rare-earth-ion-doped region 502 is $Tm^{3+}/Yb^{3+}$ co-doped multi-component germanosilicate glass, the rare-earth-ion-doped region 503 is $Ho^{3+}/Yb^{3+}$ co-doped multi-component germanosilicate glass, and the cladding 504 is multi-component germanate glass without rare earth ions. Each of $Er^{3+}$, $Tm^{3+}$, $Ho^{3+}$ and $Yb^{3+}$ has a doping concentration larger than 5 wt %.

The gain fiber is manufactured by a three-dimensional printing method including the following steps.

a. Manufacture of composite structural core rod: the cores with the sector structures are respectively manufactured by a three-dimensional printing process according to a design formula and size, and the cores are assembled into a composite structural core rod according to the design to form the rare-earth-ion-doped region 501, the rare-earth-ion-doped region 502, and the rare-earth-ion-doped region 503. And a cladding glass tube 504 is also manufactured by a three-dimensional printing process.

d. Optical fiber drawing: the composite structural core rod and the cladding glass tube are assembled into a composite structural fiber preform, which is drawn into the gain fibers. The cross-section of the gain fiber is shown in FIG. 5.

As measured by a small signal gain test method, the composite structural optical fiber has a maximum gain coefficient of 5.2 dB/cm in the near-infrared waveband, and a maximum gain coefficient of 3.2 dB/cm in the mid-infrared waveband.

(2) Constructing a Fiber Laser

Figure 6:
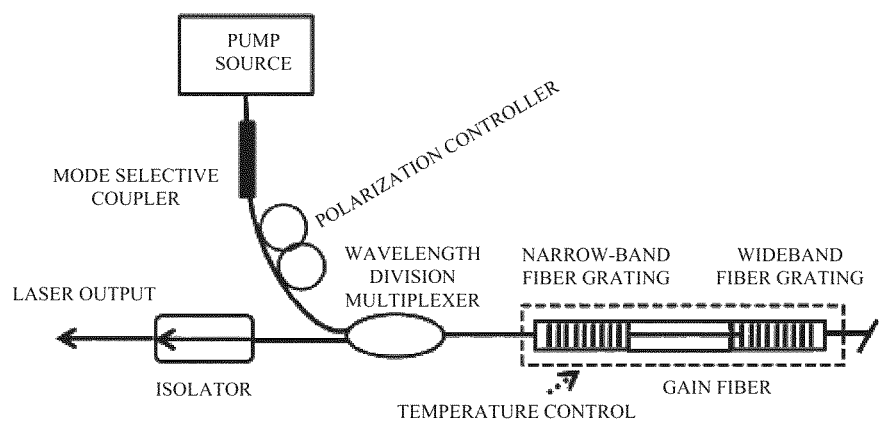
FIG. 6 illustrates a schematic diagram of a structure and laser output of a fiber laser described in Embodiment 4.

A tunable laser output is realized by constructing a fiber laser using the above-described gain fiber. The schematic view of the structure and the laser output of the fiber laser are illustrated in FIG. 6. The 980 nm pump light is converted into a linear polarization mode $LP_{11}$ with a two-lobed light spot shape, i.e., the light field has two maximum values in the azimuthal direction, by a mode selective coupler. The $LP_{11}$ mode can be rotated by using a polarization controller, so that the maximum values of the light field are located in the rare-earth-ion-doped regions 501, the rare-earth-ion-doped regions 502, or the rare-earth-ion-doped regions 503, thereby exciting different rare earth ions to generate corresponding gains, and realizing laser switching between different wavebands. Central operating wavelengths of fiber grating pairs at both ends of the composite structural gain fiber can be adjusted by a temperature or stress regulating device, and the lasing wavelength is tunable in a specific waveband from 1,450 nm to 2,150 nm.

It can be seen from Embodiments 1-4 that by combining the design of the optical fiber structure and the control of the light field of the pump light, a plurality of rare earth ions with different emission wavelengths can be independently integrated in the same optical fiber. By selectively exciting the luminescent ions in different regions of the core, while suppressing the fluorescence emission in other wavebands, and reducing the heat generation, a tunable laser output can be achieved more effectively, which is expected to be applied in the fields such as tunable wideband single frequency fiber lasers with high power, high efficiency, low noise and narrow line width, and tunable wideband ultra-high-repetition-rate mode-locked fiber lasers. Particularly in the infrared wideband, the tunable laser output has a significant effect. Two or three of the rare earth ions of $Er^{3+}/Yb^{3+}$, $Tm^{3+}/Yb^{3+}$, $Ho^{3+}/Yb^{3+}$ can be doped into the core, and $Yb^{3+}$, is co-doped as sensitizer in each different region, thus the high-efficiency 1,450-2,050 nm or 1,450-2,150 μm wideband illumination can be achieved by using a single-wavelength commercial pump source.

The technical features of the above-described embodiments can be combined arbitrarily. For the sake of brevity of description, all possible combinations of the technical features in the above embodiments are not described. However, as long as there is no contradiction between the combinations of these technical features, all combinations should be considered within the scope of the description.

The above-described embodiments merely represent several embodiments of the present disclosure, and the description thereof is more specific and detailed, but it is not to be construed as limiting the scope of the present disclosure. It should be noted that a number of deformations and improvements may be made by those skilled in the art without departing from the concept of the present disclosure. Therefore, the scope of the present disclosure should be determined by the appended claims.

What is claimed is:

1. A manufacturing technique of ultra-wideband high gain optical fibers and devices, comprising following steps:

(1) manufacturing a gain fiber, wherein the gain fiber is a composite structural optical fiber comprising a core and a cladding, the core is composed of a plurality of sets of symmetrically distributed sector structures or a plurality of concentric ring structures, the plurality of sets of sector structures or the plurality of ring structures are composed of at least two kinds of rare-earth-ion-doped glass, luminescence centers of rare earth ions are located in different sector structure regions or ring structure regions in the core respectively, and the gain fiber has a gain coefficient larger than 1 dB/cm, and a gain bandwidth greater than 150 nm; and (2) constructing a fiber laser, comprising: using the composite structural optical fiber in step (1) as the gain fiber, selectively exciting the rare earth ions in different sector structure regions or ring structure regions in the core by controlling a shape of a pump light spot, and combining with fiber grating pairs to achieve tunable laser output;

wherein the shape of the pump light spot is controlled by a mode selective coupler and/or a fiber polarization controller in step (2):

wherein:

for the gain fiber of which the core is composed of the ring structures, pump light is converted into a vector mode by the mode selective coupler, to generate ring pump light, and temperature or stress regulation is performed on the mode selective coupler to convert the pump light into the vector mode in a different order, so that the maximum values of light field are located in the ring structure regions doped with different rare earth ions, thereby exciting different rare earth luminescence centers to generate corresponding gains, and realizing laser switching between different wavebands; and central operating wavelengths of fiber rating pairs at both ends of the gain fiber are adjusted by a temperature or stress regulating device to implement that a wavelength of output laser is tunable in a specific waveband;

for the gain fiber of which the core is composed of the sector structures, pump light is converted into a linear polarization mode with a two-lobed spot shape by the mode selective coupler, and an $LP_{11}$ mode is controlled to rotate by the polarization controller, so that the maximum values of light field are located in the sector structure regions doped with different rare earth ions, thereby exciting different rare earth luminescence centers to generate corresponding gains, and realizing laser switching between different wavebands; and central operating wavelengths of fiber grating pairs at both ends of the gain fiber are adjusted by a temperature or stress regulating device to implement that a wavelength of output laser is tunable in a specific waveband.

2. The manufacturing technique of ultra-wideband high gain optical fibers and devices according to claim 1, wherein a method of manufacturing the gain fiber in step (1) is a rod-in-tube method, a molten core drawing method, a high pressure assisted melt filling method, a high pressure chemical vapor deposition method, a double crucible method, a casting method, an extrusion molding method or a 3D printing method.

3. The manufacturing technique of ultra-wideband high gain optical fibers and devices according to claim 1, wherein the rare-earth-ion-doped glass is multi-component glass.

4. The manufacturing technique of ultra-wideband high gain optical fibers and devices according to claim 3, wherein the multi-component glass, is selected from one or more of multi-component germanate glass, multi-component phosphate glass, multi-component tellurite glass, multi-component chalcogenide glass, multi-component fluoride glass, multi-component aluminate glass, multi-component borate glass, multi-component silicate glass, multiple-component bismuthate glass, multi-component germanosilicate glass.

5. The manufacturing technique of ultra-wideband high gain optical fibers and devices according to claim 4, wherein the multi-component glass is one or more of multi-component germanate glass, multi-component silicate glass or multi-component tellurite glass.

6. The manufacturing technique of ultra-wideband high gain optical fibers and devices according to claim 1, wherein the cladding is composed of multi-component glass.

7. The manufacturing technique of ultra-wideband high gain optical fibers and devices according to claim 6, wherein the multi-component glass is selected from one or more of multi-component germanate glass, multi-component phosphate glass, multi-component tellurite glass, multi-component chalcogenide glass, multi-component fluoride glass, multi-component aluminate glass, multi-component borate glass, multi-component silicate glass, multiple-component bismuthate glass, multi-component germanosilicate glass.

8. The manufacturing technique of ultra-wideband high gain optical fibers and devices according to claim 7, wherein the multi-component glass is one or more of multi-component germanate glass, multi-component silicate glass or multi-component tellurite glass.

9. The manufacturing technique of ultra-wideband high gain optical fibers and devices according to claim 1, wherein the cladding has a single cladding structure or a multi-cladding structure.

10. The manufacturing technique of ultra-wideband high gain optical fibers and devices according to claim 9, wherein an outer surface of the cladding further comprises a coating layer.

11. The manufacturing technique of ultra-wideband high gain optical fibers and devices according to claim 1, wherein the composite structural optical fiber is a single mode optical fiber.

12. The manufacturing technique of ultra-wideband high gain optical fibers and devices according to claim 1, wherein the rare earth ions are selected from one or more kinds of $Er^{3+}$, $Tm^{3+}$, $Ho^{3+}$, $Ce^{3+}$, $Eu^{3+}$, $Eu^{2+}$, $Sm^{3+}$, $Sm^{2+}$, $Tb^{3+}$, $Nd^{3+}$, $Dy^{3+}$, $Yb^{3+}$ or $Pr^{3+}$.

13. The manufacturing technique of ultra-wideband high gain optical fibers and devices according to claim 1, wherein the composite structural optical fiber is a single mode optical fiber, the core is in a configuration of concentric ring structures, and a number of the ring structures is 2-3.

14. The manufacturing technique of ultra-wideband high gain optical fibers and devices according to claim 3, wherein the composite structural optical fiber is a single mode optical fiber, the core is in a configuration of sets of symmetrically distributed sector structures, and a number of the sets of symmetrically distributed sector structures is 2-3.

15. The manufacturing technique of ultra-wideband high gain optical fibers and devices according to claim 1, wherein each of the core and the cladding is composed of multi-component germanate glass, and the rare earth ions are selected from two or three of $Er^{3+}/Yb^{3+}$, $Tm^{3+}/Yb^{3+}$, or $Ho^{3+}/Yb^{3+}$.

16. The manufacturing technique of ultra-wideband high gain optical fibers and devices according to claim 15, wherein each of the rare earth ions $Er^{3+}$, $Tm^{3+}$, $Ho^{3+}$, and $Yb^{3+}$ in the core has a doping concentration larger than 5 wt %, the gain fiber has a maximum gain coefficient larger than or equal to 5.2 dB/cm in a near-infrared waveband, and the gain fiber has a maximum gain coefficient larger than or equal to 3.2 dB/cm in a mid-infrared waveband.

* * * * *